United States Patent [19]

Alexis

[11] 4,385,381
[45] May 24, 1983

[54] DIGITAL RADIO TRANSMISSION SYSTEM FOR TRANSMITTING A PLURALITY OF INFORMATION SIGNALS BY A NETWORK OF TRANSMITTERS HAVING SUBSTANTIALLY THE SAME CARRIER FREQUENCIES

[75] Inventor: Roger P. J. Alexis, Neuilly sur Seine, France

[73] Assignee: U.S. Philips Corporation, New York, N.Y.

[21] Appl. No.: 178,200

[22] Filed: Aug. 14, 1980

[30] Foreign Application Priority Data

Aug. 29, 1979 [FR] France ............................... 79 21674

[51] Int. Cl.³ ........................... H04J 1/02; H04J 4/00
[52] U.S. Cl. .................................... 370/69.1; 370/70; 370/118
[58] Field of Search ................. 370/50, 69.1, 70, 118, 370/6; 375/38

[56] References Cited

U.S. PATENT DOCUMENTS

| | | | |
|---|---|---|---|
| 3,663,761 | 5/1972 | Kumagai et al. ..................... | 370/6 |
| 4,047,108 | 9/1977 | Bijker et al. ......................... | 375/38 |
| 4,142,155 | 2/1979 | Adachi ................................ | 375/38 |
| 4,237,551 | 12/1980 | Narasimha .......................... | 370/50 |

OTHER PUBLICATIONS

"Digital Mobile Radio Telephone System Using TD/FDMA Scheme" by Kinoshita et al., Conference: 1981 International Conf. on Communications, Denver, CO. Jun. 14-18, 1981.

*Primary Examiner*—Douglas W. Olms
*Attorney, Agent, or Firm*—Thomas A. Briody; William J. Streeter; Edward W. Goodman

[57] ABSTRACT

In this system in which the information signals to be transmitted are converted into the digital form, transmission is done via a frequency-division multiplexer which so transmit the bits of the information signals in parallel that the duration of the bits transmitted through the channels of the multiplexer is longer than double the difference in propagation time between two carriers obtained from the two transmitters which are nearest in the receiving zone, where the said carriers have levels which are near to one another. This solves the problem of overlap between the information signals. To control the problem of fading, three types of transmitters which have three carriers whose deviation is very small compared with the bandwith of a channel are used in the transmitter network.

5 Claims, 3 Drawing Figures

DIGITAL RADIO TRANSMISSION SYSTEM FOR TRANSMITTING A PLURALITY OF INFORMATION SIGNALS BY A NETWORK OF TRANSMITTERS HAVING SUBSTANTIALLY THE SAME CARRIER FREQUENCIES

BACKGROUND OF THE INVENTION

The invention relates to a radio transmission system for simultaneously transmitting a plurality of information signals, the system comprising a network of transmitters operating with substantially the same carrier frequencies and receiving the said information signals synchronously.

Such a system may be used, for example, for private networks for transmitting information signals to mobile receivers or for the transmission of several high quality radio programs to a receiving area. As known, transmitter networks which were characterized by different carrier frequencies in the VHF range, which carrier frequencies corresponded with the programs to be transmitted have always been used sofar for this purpose. The greatest drawback of this technique is that it gives rise to a high spectral congestion.

To obviate this drawback, the invention proposes to transmit several information signals, that is to say several programs in the above-mentioned example, by a network of transmitters which operate with substantially the same carrier frequencies, for example 100 MHz.

However, such a system causes some problems as regards the reception. One problem is caused by interferences between VHF signals of the same frequency, which are received from several transmitters. In receiving areas where the different signals are received with levels which are very near to one another, these interferences may result in an almost complete disappearance of the total signal received by the receiver. It should furthermore be noted that this phenomenon, denoted "fading" hereinafter, also depends for a mobile receiver on the Doppler effect. A further problem is caused by the fact that, even if precautions have been taken to apply the same information signals synchronously to the different transmitters of the network, a receiver does not synchronously receive these signals, particularly from the two transmitters nearest to the receiver, because of the difference in propagation time of the carrier signals. The same information signals coming from the two nearest transmitters, which have been subjected to different delays, then overlap. These overlaps are not annoying when the received carrier signals have different levels. In contrast therewith, in zones where the carrier signal levels are near to one another, the quality of the reception deteriorates. This deterioration is manifested by serious distortions when the transmitted signals are analog signals and by a high error probability when the transmitted signals are data signals.

A known means to solve these problems is described in U.S. patent application Ser. No. 938,046, filed Aug. 30, 1978. This solution is based on the diversity technique, and consists of the transmission of at least twice the same information signal and by having the ratio between the transmitter powers of at least two transmitters vary between an information signal transmission and the next transmission of this information signal. In this manner, the position of the zones where the reception is poor is varied, so that a random receiver receives alternately a high grade information signal.

SUMMARY OF THE INVENTION

It is an object of the present invention to provide a completely different means to solve the above-mentioned difficulties in the reception, which solution may prove to be much more practical in certain cases.

According to the invention, as the information signals are in the digital form, the transmission of these signals is effected by means of a frequency-division multiplex circuit which so transmits the bits of the information signals in parallel that the duration of the bits in the channels of the multiplex circuit is substantially longer than double the difference in propagation time between two carrier signals of the two nearest transmitters in the receiving zone where the levels of the said carrier signals are near to one another.

This measure according to the invention solves the problem of overlap between the information signals, for attention must be paid to overlaps which may occur between the binary signals which are transmitted through the same channels of the multiplex circuit. The duration of the bits has been chosen so that this overlap is not annoying.

To solve the problem of fading caused by interferences between carrier signals, the transmitter network according to the invention comprises three types of transmitters which operate with three carrier frequencies, two of these frequencies deviating by the same amount from the third carrier frequency, this deviation being small compared with the bandwidth of a channel of the frequency-division multiplex circuit and being large compared with the possible deviations from the received carrier frequencies, these three types of transmitters having been positioned thus in the network that, within the network, a receiver distinguishes the three types of transmitters among the three nearest transmitters.

With this measure it is possible to solve the problem of fading, as the possibility that it appears and the duration thereof can be predicted, so that the resultant errors can be corrected by means of an adapted autocorrecting code.

For the frequency-division multiplexing operation on transmission, and the corresponding demultiplexing operation on reception, advantageous use can be made of methods digital method based on the Fourier transform or analog transforms.

DESCRIPTION OF THE DRAWINGS

The invention will now be further explained by way of non-limitative example with reference to the accompanying drawings.

DESCRIPTION OF THE PREFERRED EMBODIMENT

Figure 1:
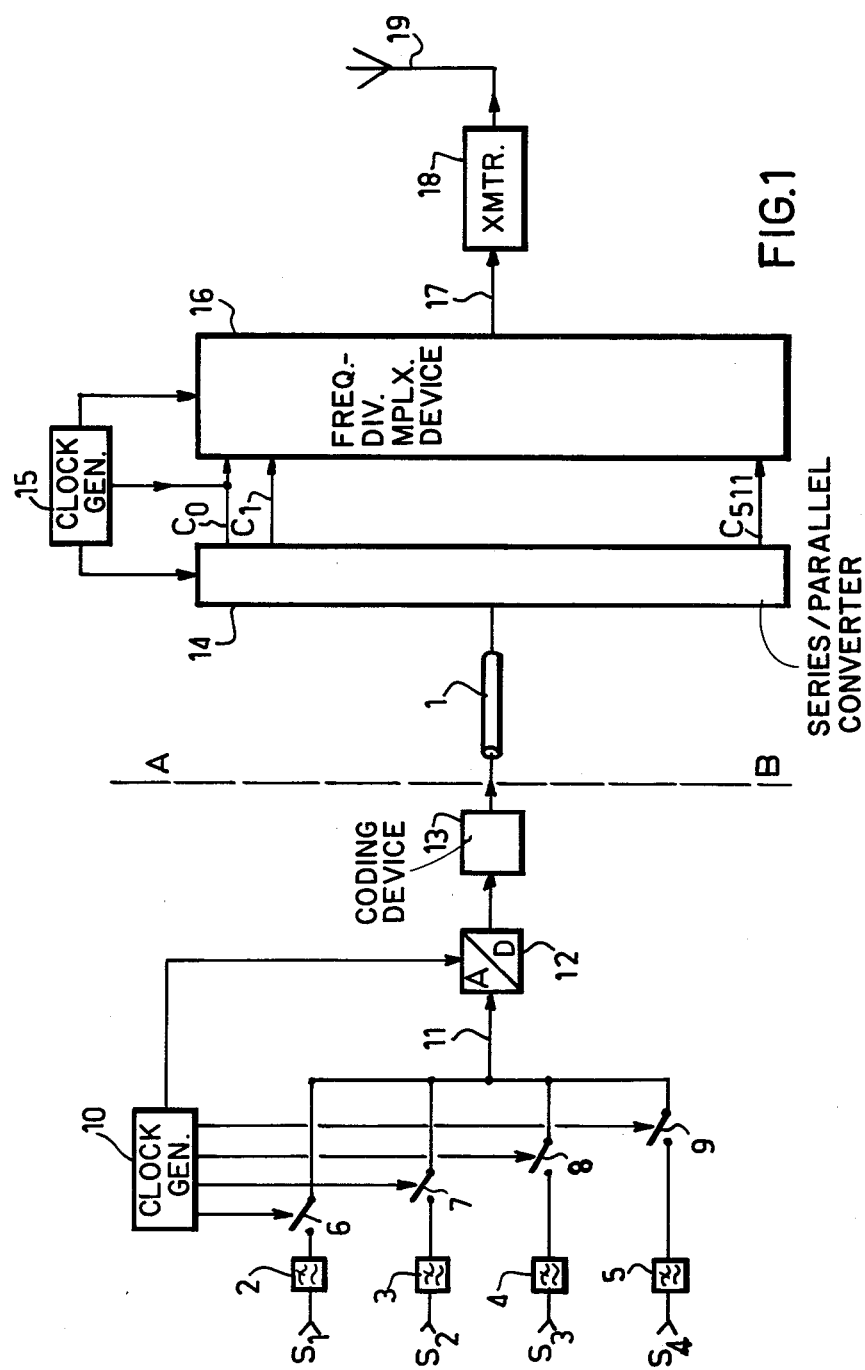
FIG. 1 is a diagram of the circuit used at the transmitter end of the radio transmitting system.

FIG. 1 shows the diagram of the circuit used to transmit several information signals in the radio transmission system according to the invention. By way of example, let it be assumed that these information signals are four sound signals $S_1$, $S_2$, $S_3$ and $S_4$, which correspond to four high-grade radio programs produced in a radio transmission center and which must be transmitted to an area through a network of transmitters which operate with substantially the same carrier frequency. In the drawing, the assembly shown to the left of the line AB is located in the center, whereas to the right of this line AB a coaxial cable 1 connects the center to a different assembly, which represents one of the transmitters in the network.

In the wireless center, the four signals $S_1$ to $S_4$ inclusive, are applied to low-pass filters 2 to 5, which limit their maximum frequency to a value of 15 kHz, which is usually permissible for high-grade signals. Each of the frequency-limited signals $S_1$ to $S_4$, inclusive, is sampled with the frequency of 32 kHz by means of sampling circuits 6 to 9, inclusive, which are triggered by sampling pulses which are formed thus in the clock generator 10, the sampling pulses being equally distributed in the time. The outputs of the sampling devices 6-9 are connected to the line 11, on which samples of the time-division multiplexed signals $S_1$, $S_2$, $S_3$, $S_4$ appear with a rate of 128000/S.

These samples are applied to an analog-to-digital converter 12, which converts each sample in accordance with a suitable law into a 13-bit number. The duration $\tau$ of each bit is determined by the clock frequency produced by clock generator 10. This clock frequency is $=1/2.043$ $\mu s \approx 0.5$ $\mu S$.

It will be easily seen that, at the output of the converter 12, a digital signal is obtained in which the bit rate is equal to 2.048 M bits/S; in this signal every 13-bit number which represents the samples of $S_1$, $S_2$, $S_3$, $S_4$ and which occupies a time interval of $13\tau$, is followed by a free time interval of the duration $3\tau$. In accordance with a measure of the invention, which shall be further explained hereinafter, a coding device 13 introduces an auto-correcting error code into the digital signal produced by the converter 12, the redundant bits of this code occupying at least a portion of the above-mentioned free time intervals of $3\tau$. Therefore, the signal of 2.048 M bits/S thus obtained forms a time-division multiplex signal formed by the distribution in time of the digital signals $S_1$, $S_2$, $S_3$, $S_4$, which, as described above, have been coded with an error correcting code.

This time-division multiplex signal which is received from the wireless transmitting center is applied through coaxial cables, or via radio links, to the different transmitting stations of the network. In FIG. 1 reference numeral 1 denotes a connection to a transmitting station through a coaxial cable.

According to the invention, a time-division multiplex signal is applied at a rate of 2.048 M bits/S to a series-to-parallel converter 14 having, for example, 512 outputs $C_0$ to $C_{511}$, inclusive. This converter 14 distributes the bits of the time-division multiplex signal of 2.048 M bits/S over its 512 outputs and causes them to appear simultaneously at all its outputs at a frequency 2048/512 kHz, or 4 kHz, this frequency being determined by a clock generator 15. This clock generator 15 is synchronized by prior art means, not shown, with the clock generator 10 of the transmitting center. In the example chosen here, it is easy to see that during a period of approximately 250 $\mu S$, which corresponds to the frequency of 4 kHz, eight samples of each of the signals $S_1$, $S_2$, $S_3$ and $S_4$ appear at the total number of 512 outputs, it being possible for each sample to occupy 16 outputs with the auto-correction error code introduced by the coder 13.

Hence the bits occur with a rate of 4 k bits/S at each output of a series-to-parallel converter 14 for a sequence of bits which are alternately logic "1" and "0". Each of these signals is applied as the channel signal to a frequency-division multiplex device 16 having 512 adjacent channels, each having a width of 4 kHz. This frequency-division multiplex device 16 can be implemented in accordance with any prior art technique. In accordance with an analog technique of the type used in telephony, the channels of this frequency-division multiplex device 16 may be formed by modulating the amplitude of carriers, which are spaced 4 kHz from one another, by the modulation signals which are obtained at the outputs of the converter 14 and which have been adequately filtered by low-pass filters, which attenuate the frequencies above 2 kHz to reduce the cross-talk between the channels. It will be seen that in the present case the restraints as regards cross-talk are of comparatively little importance as the signals to be transmitted in each channel may be considered as data having two values "0" or "1", which can be easily distinguished on reception. By forming the sum of the carrier signals thus modulated, it is possible to obtain on the line 17, which is connected to the output of the frequency-division multiplex device 16, a baseband analog frequency division multiplex signal which occupies the band 0-2048 kHz at a maximum.

For the purpose of synchronization on reception, the first frequency-division multiplex channel, which corresponds to a carrier frequency equal to zero, is reserved for the transmission of a synchronizing signal. This synchronizing signal is a sinusoidal signal having a frequency of 2 kHz, which is represented in digital form by a sequence of bits which are alternately digital "1" and "0" and which occur at a rate of 4 kbits/s. In the Figure, such a signal is received from a special output of the clock generator 15 and applied to the first input of the frequency-division multiplex device 16, which does not receive any other signal from the output $C_o$ of the converter 14.

The same frequency-division multiplexing operation may alternatively be carried out by digital techniques using a Fourier transform. A frequency-division multiplex device of this time is described in, for example, French Pat. No. 2,188,920, filed in applicant's name, corresponding to co-pending U.S. patent application Ser. No. 166,285, filed July 7, 1980. In accordance with digital techniques of this type, the frequency-division multiplex operation may alternatively be carried out by means of an integrated device, marketed by Messrs. RETICON and which utilizes the transform known in English as "Chirp Z transform". Generally, the devices utilizing these digital techniques realize roughly the functions of the series-to-parallel converter 14 and the frequency-division multiplex device 16; so they receive the time-division multiplex signal directly at a rate of 2.048 M bits'S and produce a digital signal which corresponds with the baseband frequency signal which was sampled with a rate of 2.048 MHz. A digital-to-analog conversion must then be carried out at the output of such a digital device in order to obtain the frequency-division multiplex signal in the desired analog form on the line 17.

This base-band frequency division multiplex signal is applied to a transmitter 18, where it is converted to the desired transmitting frequency (100 MHz), for example, and thereafter amplified to be applied to the transmitting aerial 19. As binary signals are transmitted through the channels of the frequency division multiplex signal the requirements as regards the linearity of this amplification in the overall band of the frequency division multiplex signal are not very severe.

Figure 2:
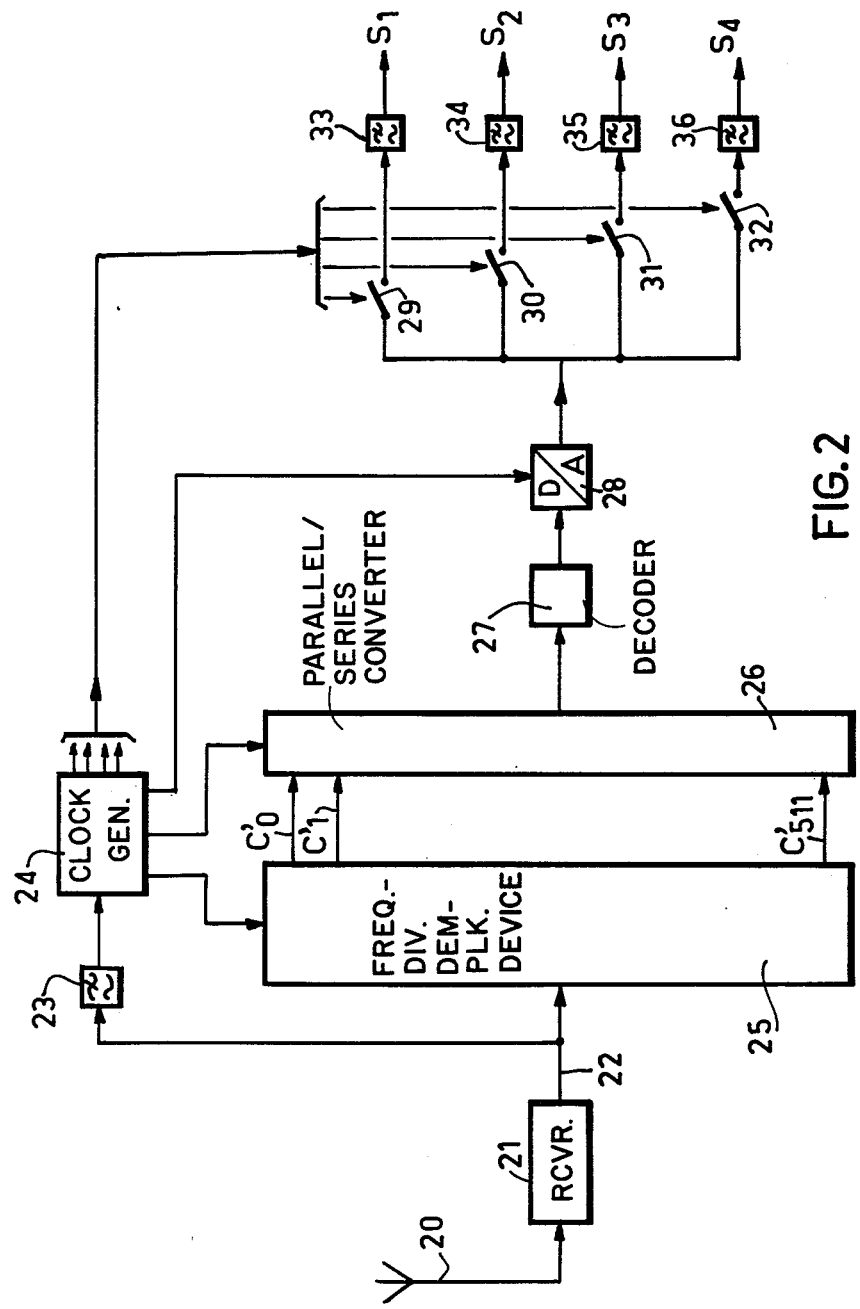
FIG. 2 is the diagram of the circuit used at the receiving end.

In the receiving section, whose circuit diagram is shown in FIG. 2, operations are carried out which are the inverse of the operations carried out in the transmitting section. The signal received by the aerial 20 is applied to the receiver 21 which has been tuned to the frequency 100 MHz of the transmitted carrier and which produces at its output 22 the analog baseband division multiplex signal which is the same as that applied to the transmitter 18.

This signal is applied to a selective filter 23, which substracts the 2 kHz synchronizing signal from this signal, this synchronizing signal having been applied in the transmitter to the first channel of the frequency-division multiplex signal. This selected 2 kHz frequency is used to control the local clock generator 24, which produces the various sampling frequencies required for a proper operation of the receiver.

The baseband frequency-division multiplex signal is also applied to a frequency demultiplexing device 25 operating, for example, in the analog mode and carrying out operations which are the reverse of the operations carried out in the multiplexer 16 of the transmitter for producing in baseband the signals which are transmitted by the 512 frequency-division multiplex channels. Let it be assumed that the 512 outputs $C'_0$ to $C'_{511}$, inclusive, of the demultiplexing device 25 are preceded by a pulse shaper; the same binary signals as those which were applied to 512 inputs of the frequency-division multiplex circuit 16 of the transmitter are then obtained at the totality of these 512 outputs. The bits of these binary signals appear simultaneously with the frequency of 4 kHz and, during the duration of approximately 250 uS of each bit, they represent 8 samples of each of the information signals $S_1$, $S_2$, $S_3$, $S_4$, which were encoded by an automatic error correction code.

The binary signals appearing at the outputs of the demultiplexer 25 are applied to the parallel-to-series converter 26, which produces at its output the 2.048 M bits/S time-division multiplex signal which is the same as that applied to the series-to-parallel converter 14 of the transmitter.

The whole assembly formed by the demultiplexer 25 and the series-to-parallel converter 26 may alternatively be obtained by digital means using a transform which is the reverse of the transform used at the transmitter end.

The time-division multiplex signal obtained at the output of the converter 26 is applied to the decoder 27, which removes the redundancy bits introduced by the coding device 13 of the transmitter, by correcting the controlled errors, as will be explained hereinafter.

Time-division multiplexed digital samples of information signals $S_1$, $S_2$, $S_3$, $S_4$ are obtained at the output of the decoding device 27 and also at the output of the converter 12, these samples occurring at a rate of 128,000 per second.

These samples, which are converted into the analog mode by the digital-to-analog converter 28, are applied by the interruptor circuits 29, 30, 31, 32 to the low-pass filters 33, 34, 35, 36, so that samples of the signals $S_1$, $S_2$, $S_3$, $S_4$ respectively, appear at the input of these filters. To this end, the interruptor circuits 29 to 32 inclusive are driven by 32 kHz pulses, which are also divided in time and which are available at the outputs of the local clock pulse generator 24. A reconstitution of the information signals $S_1$ to $S_4$ inclusive, in accordance with the programs transmitted in the transmitting center, is obtained at the outputs of the low-pass filters 33 to 36 inclusive. One of these programs can be easily selected without changing the tuning of the receiver 21.

In addition to the advantage that it has a lower spectral congestion, a radio transmission system designed thus has a proper immunity to noise, owing to the fact that the information signals are transmitted in digital form.

Furthermore, this solves already one of the problems which occur in a radio transmission system using a network of transmitters operating with the same carrier frequency.

In the foregoing the problem of overlap between the same modulation signals which arrive at a receiver from different transmitters of the network and which have been submitted to different propagation times, has already been mentioned. In practice, this overlap problem, which may result in errors in the reception, occurs only in the reception zones in which the carrier signals received from the two nearest transmitters have a difference in level which is less than approximately 12 dB. Assuming, taking the effect of the ground into consideration, the reduction of the field H with distance d to be 14 dB per octave ($H \approx 1/d^{2,3}$) and by assuming, for example, that a receiver is located between two transmitters which are 100 km removed from one another on the straight line connecting these transmitters, it is possible to compute that a level difference of 12 dB for the two carrier signals received by the receiver corresponds with a deviation in the propagation time of approximately 100 $\mu$s. In the system according to the invention the overlap between the modulation signals transmitted through the same channels of the multiplexing signal must be considered, and these modulation signals are binary signals having a duration T=250 $\mu$s. When the deviation in propagation time, that is to say the duration of overlap of the binary element, is less in each channel than half the duration T of a bit, this overlap cannot introduce an error in the receiver. This was checked in the above example in which $\theta = 100$ uS is less than T/2=125 $\mu$s.

By choosing a sufficiently large number of frequency-division multiplex channels in the system according to the invention, which means that the binary capacity in each channel is reduced, the problem of overlap between the modulation signals can be solved in a very simple manner. In this respect it should be noted that the solution, in which the time-division multiplex signal (which has a rate of 2.048 M bit/S) were transmitted directly and not via a frequency division multiplexer, would have resulted in a duration of the binary element of approximately 0.5 $\mu$S, which is very short with respect to the deviation between the propagation times (100 $\mu$S in the chosen example). To compensate for the deviations in the propagation times, the receiver should be provided with a very complicated and expensive equalizer.

Although the problem of overlap between modulation signals has been solved, the problem of interferences between VHF signals coming from different transmitters of the network still remains, which may cause, as demonstrated above, the local appearance of fading in receiving zones where the received carrier signals are close to one another. In the case where the receiver is stationary, it is possible to eliminate this phenomenon by using, for the considered VHF frequencies, a directional aerial of the type used for television. In contrast therewith, an omnidirectional aerial is preferably used for mobile receivers, which is simpler to use, but the problem of the VHF frequencies still remains.

The invention also provides a solution for this problem. We shall now first indicate calculations relating to VHF interferences and which resulted in the solution.

Figure 3:
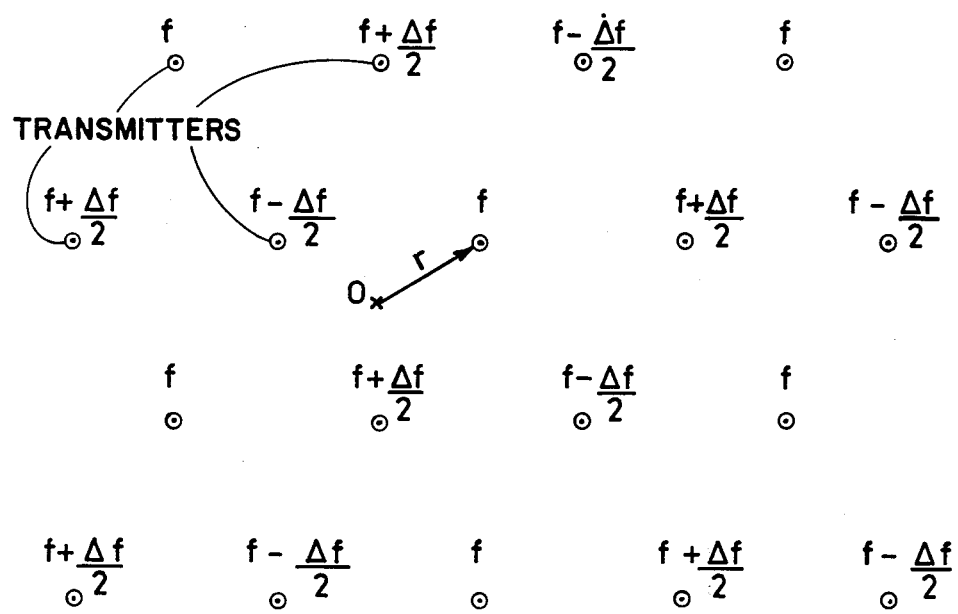
FIG. 3 shows a configuration of the transmitter network according to the invention.

Let it be assumed that the network of transmitters has the theoretical configuration shown in FIG. 3, in which the transmitters, denoted by small circles, are located at the top angles of equilaterial triangles. It is assumed that the possibility of fading owing to interferences is greatest in a point such as O, located at the same distance r of the three nearest transmitters. In any area around this point, carrier signals of any phase, coming from:
- 3 transmitters at distance r
- 3 transmitters at distance 2r
- 6 transmitters at distance 2.67r etc. are received.

For a mobile receiver, the phase of a received carrier is determined in particular by the Doppler effect which causes, for a transmitter wave length $\lambda = 3$ m ($f = 100$ MHz) and a speed of displacement of the receiver $v = 45$ m/S, a frequency variation of $f_d = v/\lambda = 15$ Hz.

As in the foregoing it is assumed that the decrease of the field H with distance amounts to 14 dB per octave. In the zone surrounding the point 0 there are therefore received, if the field produced by the three nearest transmitters is used as a reference:
- 3 amplitude signals V (0 dB)
- 3 amplitude signals 0.2 V ($-14$ dB)
- 6 amplitude signals 0.10 V ($-20$ dB) etc.

Now the possibility that fading is produced is calculated between two extreme cases which border on the real case. In the first case let it be assumed that 3 amplitude signals V of any phase are received from the nearest transmitters. In the second case let it be assumed that the above-mentioned signals are received with an amplitude V, 0.2 V, 0.10 V ... etc. with any phase from an infinite number of transmitters.

The firstmentioned situation will be considered first. First the probability will be investigated in which the amplitude S of the sum of three signals of the same amplitudes V and having phases 0, $\alpha$ and $\beta$ which are below a value kV, such that $k << 1$. $\alpha$ and $\beta$ are the phases of two signals relative to the zero phase of the third signal, which has been taken as a reference. kV is the level of the signal above which fading occurs in practice in a receiver.

This condition may be written:

$$(1 + \cos \alpha + \cos \beta)^2 + (\sin \alpha + \sin \beta)^2 < k^2 \text{ or} \quad (1)$$

$$1 + 4 \cos \frac{\alpha + \beta}{2} \cdot \cos \frac{\alpha - \beta}{2} + 4 \cos^2 \frac{\alpha - \beta}{2} < k^2$$

In the circumstances which may effect fading, the phases $\alpha$ and $\beta$ are near to $2\pi/3$ and $4\pi/3$. Let:

$$\begin{cases} \alpha = \frac{2\pi}{3} + \epsilon_1 \\ \beta = \frac{4\pi}{3} + \epsilon_2 \end{cases} \quad (2)$$

wherein $\epsilon_1$ and $\epsilon_2$ are small phase deviations relative to the phases $2\pi/3$ and $4\pi/3$. Formula (1) may be written, when only the terms of the second order are considered:

$$\tfrac{3}{4}(\epsilon_1 - \epsilon_2)^2 + \tfrac{1}{4}(\epsilon_1 + \epsilon_2)^2 < k^2 \quad (3)$$

By assuming that:

$$\begin{cases} \epsilon_1 + \epsilon_2 = x \\ \epsilon_1 - \epsilon_2 = y \end{cases} \quad (4)$$

formula (3) is written:

$$\tfrac{3}{4} y^2 + \tfrac{1}{4} x^2 < k^2 \quad (5)$$

The equation $\tfrac{3}{4} y^2 + \tfrac{1}{4} x^2 = k^2$, which corresponds to the inequality (5), is the equation of an ellipse E in the system of rectangular coordinates 0x, 0y; the length of half the short axis of this system is $2/\sqrt{3}$ and the length of half the long axis is 2k.

The probability that the sum of the three vectors is less than kV is:

$$p_3 = \frac{1}{(2\pi)^2} \iint_{(E)} d\epsilon_1 d\epsilon_2 = \frac{\pi 4 k^2}{\sqrt{3}} \cdot \frac{1}{4\pi^2}$$

that is to say (6) $P_3 = 0.18 \, k^2$.

In the second computational example, the probability must be looked for in which the amplitude of the sum of a infinite number of signals having the above-mentioned amplitudes and any random phases is less than kV. The modulus of this sum has a Rayleigh distribution having a finite average value Vo, for the sum of the powers received in one point converges as soon as the attenuation, as a function of the distance, exceeds 6 dB per octave. The probability looked for is:

$$p_\infty = 1 - \exp\left(-\frac{k^2 V^2}{2 V_o}\right) \simeq \frac{k^2 V^2}{2 V_o^2} \text{ (for } kV << V_o\text{)}$$

With the amplitudes which were already mentioned accurately it is obtained that $$V_o^2 = 3V^2 + 3(0.2 \, V)^2 + 6(0.1 \, V)^2 + \ldots \simeq 3.2 \, V^2$$

hence $$P_\infty 0.16 \, k^2 \quad (7)$$

It will be seen that the calculated probabilities that fading occurs in the two considered extreme cases, which are defined by the formulae (6) and (7), differ only little and for the practical cases a probability may be assumed which has an intermediate value of, for example:

$$P = 0.17 \, k^2. \quad (8)$$

After having calculated the probability of fading, the duration of fading will be calculated, that is to say the maximum period of time during which the amplitude of the sum of the signals received from the transmitters in the network remains below kV. The foregoing has shown that, in order to obtain an approximated value, the formulae can be used which are valid for the case of the three signals.

The variable t which corresponds with time can be introduced in the formula (3) which represents the fading circumstances, by assuming that:

$$\begin{cases} \epsilon_1 = 2\pi \Delta f_1 t \\ \epsilon_2 = 2\pi \Delta f_2 t \end{cases} \quad (9)$$

wherein $\Delta f_1$ and $\Delta f_2$ are frequency deviations which correspond to the phase deviations $\epsilon_1$ and $\epsilon_2$ defined by the formulae (2). By denoting the frequency of the phase reference signal 0 as $f_0$ and the frequencies of the two other signals as $f_1$ and $f_2$, respectively, it can be written that:

$$\begin{cases} \Delta f_1 = f_1 - f_0 \\ \Delta f_2 = f_2 - f_0 \end{cases} \quad (10)$$

Formula (3) is then written:

$$4\pi^2 (\overline{\Delta f_1}^2 + \overline{\Delta f_2}^2 - \Delta f_1 \cdot \Delta f_2) t^2 < k^2 \quad (11)$$

The time t which has been derived from the equation which corresponds in formula (11) with the equality represents the time required to cause the amplitude of the sum of the three signals to pass from 0 to the value kV, that is to say to the limit of fading.

The duration $t_f$ of a fading is double this value, so:

$$t_f = \frac{1}{\pi} \frac{k}{\sqrt{\overline{\Delta f_1}^2 + \overline{\Delta f_2}^2 - \Delta f_1 \cdot \Delta f_2}} \quad (12)$$

From the formula (12) it is possible to derive a measure according to the invention which renders it possible to minimize the duration $t_f$ of the fading which occurs, according to formula (8) with the probability $P = 0.17 \, k^2$. As the frequency deviations $\Delta f_1$ and $\Delta f_2$ cannot be very large since they are of necessity smaller than the bandwidth of a channel, it is possible to choose: $\Delta f_1 = -\Delta f_2 = \Delta f/2$, which, in accordance with formula (10) means that:

$$\begin{cases} f_1 = f_0 + \frac{\Delta f}{2} \\ f_2 = f_0 - \frac{\Delta f}{2} \end{cases} \quad (13)$$

Fading then has a duration of:

$$t_{f0} = \frac{2}{\pi \sqrt{3}} \frac{k}{\Delta f} \quad (14)$$

From the formulae (13) it follows that in accordance with a measure according to the invention, the network of transmitters must comprise three types of transmitters operating with the carrier frequencies $f_0 - \Delta f/2$, $f_0$ and $+\Delta f/2$, respectively, and having been positioned thus that a receiver, located in the zone where fading may occur always sees one transmitter of each of the three types among the three nearest transmitters. FIG. 3 shows the configuration of the three types of transmitters. The minimum frequency deviation $\Delta f/2$ between two transmitters in the network must be much smaller than the bandwidth of the transmitted frequency-division multiplex signal to avoid perceptible overlap between identical channels which are formed by the two transmitters. In addition, in order to obtain a properly defined duration of fading $t_{f0}$, the frequency deviation $\Delta f/2$ must considerably exceed the possible deviations in the received frequencies, particularly the deviation resulting from the Doppler effect. For the above-described system it is, for example, possible to choose a frequency deviation $\Delta f/2 = 160$ Hz, which is only 40% of the 4 kHz width of a frequency-division multiplex signal and is considerably larger than a frequency deviation of $2 \times 15$ Hz $= 30$ Hz, caused by the Doppler effect for a mobile receiver with respect to two transmitters.

The above-described measure renders it therefore possible to obtain properly controlled fading phenomena occuring with a probability $P = 0.17 \, k^2$ and each having a duration of not more than $$t_{f0} = \frac{2}{\pi \sqrt{3}} \frac{\pm k}{\Delta f}.$$

During the occurrence of these fading phenomena, bit errors may occur in the binary signals which are transmitted through the channels of the frequency-division multiplex signal and which are received in the receiver. These incorrect bits appear in groups whose probability of appearance is equal to the probability that fading appears, so P, the maximum number of incorrect bits in each group being determined by the maximum duration $t_{f0}$ of the fading phenomena. The invention therefore proposes to correct these errors by means of an automatic error correction code adapted to this type of errors. As explained hereinbefore, this automatic error correction code is introduced at the transmitter end by the coding device 13 for transmission through the channels of the frequency-division multiplex signal, simultaneously with the information signals; at the receiver end the decoding device 27 corrects the errors and reproduces the information signals.

In order to show how the automatic error correction code can be chosen, the below Table I shows, for different values of the quantity 20 log k, the sets of values of the fading probability $P = 0.17 \, k_2$ and of the duration of fading $$t_{f0} = \frac{2}{\pi \sqrt{3}} \frac{k}{\Delta F},$$

with $\Delta F/2 = 160$ Hz. One will recall that, as V is the amplitude of the signal at the input of a receiver, this signal coming from one single transmitter, kV is the amplitude of the signal below which fading occurs. So the quantity 20 log k represents in decibels substantially the loss in level caused by the fading, this loss in level having been produced by interferences between VHF signals.

TABLE I

| (20 log k) dB | −10 | −20 | −30 |
|---|---|---|---|
| P | $1.7 \times 10^{-2}$ | $1.7 \times 10^{-3}$ | $1.7 \times 10^{-4}$ |
| ($t_{f0}$) μS | 360 | 115 | 36 |

Among the values shown in this Table, special attention must be paid to those values which correspond with a −10 dB loss in level caused by interference. In order to find the level V again which corresponds to the reception of one single transmitter, the power of the transmitter must be increased by 10 dB. It should be noted that with one single transmitter, as is the case in the system according to the invention, interference occurs between forward and return channels of the same transmitter. The safety margin of 10 dB exists already in known systems to attenuate the effect of this type of interference. Consequently, increasing the powers of the transmitters by 10 dB does not mean an additional complication for the system according to the invention.

For 20 log k = −10 dB, Table I denotes a fading $t_{f0}$ of a duration of 360 uS which can affect not more than three consecutive bits. The probability of appearance P of these groups of incorrect bits is 1.7%. These values can be corrected by an automatic error correction code having a small number of redundant bits. A suitable code can be chosen on the basis of the book "Error Correcting Codes" by W. W. Peterson and Weldon, MIT Boston, second Edition 1971. The cyclic code (63, 55) defined in Table 11-1 on page 364 of this book may, for example, be chosen. With this code, groups of three incorrect bits can be corrected with approximately 13% redundant bits.

What is claimed is:

1. A radio transmission system for the simultaneous transmission of a plurality of information signals, the system comprising a network of transmitters, operating with substantially the same carrier frequencies and arranged to receive for transmission said information signals synchronously, and at least one receiver for receiving the signals from said transmitters, characterized in that the transmitter portion of said transmission system comprises:

means for synchronously sampling said information signals at a frequency f forming an analog time-division multiplex (TDM) signal;

means for converting said analog TDM signal into a digital TDM signal in which the samples of each of said information signals are converted into multi-bit numbers;

means for sending said serially arranged multi-bit numbers to said network of transmitters each of which comprises:

series-to-parallel converting means having n output channels for causing the bits in said multi-bit numbers to appear simultaneously at the outputs thereof, and means for frequency-division multiplexing (FDM) said parallel arranged multi-bit numbers for application to a transmitter section;

said radio transmission system being further characterized in that the receiver portion thereof comprises:

means for receiving the signals transmitted by said transmitter portion of said transmission system;

frequency-division-demultiplexing means having n output channels for converting said received signals into parallel arranged multi-bit digital signals appearing at the outputs thereof;

means for converting said parallel arranged digital signals into serially arranged digital signals;

means for converting said serially arranged digital signals into analog signals; and time-division demultiplexing means having a sampling frequency f for converting said analog signals into said original information signals, wherein the sampling frequency f of both said time-division multiplexing and demultiplexing means and the number of channels n in both said series-to-parallel converting means and said frequency-division demultiplexing means are selected such that the duration of a bit in said FDM means is at least twice the deviation in propagation times of the signals from two of said transmitters nearest to said receiver when the levels of said two signals received from said transmitters are close to one another.

2. A radio transmission system as claimed in claim 1, characterized in that the network of transmitters comprises groups of three types of transmitters, the transmitters in each group operating with three respective carrier frequencies, two of these frequencies deviating from the third frequency by the same amount, which deviation is small compared with the bandwidth of a channel of the frequency-division multiplexing means and which is large compared with the possible deviations from the received carrier frequencies, these groups of three types of transmitters being positioned in the network so that, within the network, a receiver distinguishes the three types of transmitters among the three nearest transmitters.

3. A radio transmission system as claimed in claim 2, characterized in that the digital information signals to be transmitted by the frequency-division multiplexing means are encoded by means of an automatic error correction code and the transmitted digital frequency-division multiplex signal is decoded correspondingly, said automatic error correction code having been chosen to correct for the groups of errors whose number and probability of appearance correspond to the duration and the predicted probability of fading.

4. A radio system as claimed in claim 1, 2 or 3 inclusive, characterized in that the frequency-division multiplex signal is formed, from information signals to be transmitted, by digital means which utilize a Fourier transform and, on receipt, the information signals are formed from the received frequency-division multiplex signal by digital means, which utilize the inverse transform.

5. A radio transmission system as claimed in claim 4, characterized in that the frequency-division multiplexing means further comprises a channel which transmits a synchronizing signal for the receiver, this signal consisting of a sequence of bits, which are alternately digital "1" and "0", having the same duration as the bits of the information signals transmitted through the other channels.

* * * * *